INVENTORS.
DAVID G. WALKER,
HENRY A. HOLCOMB,
BOYD M. HILL,
BY
ATTORNEY.

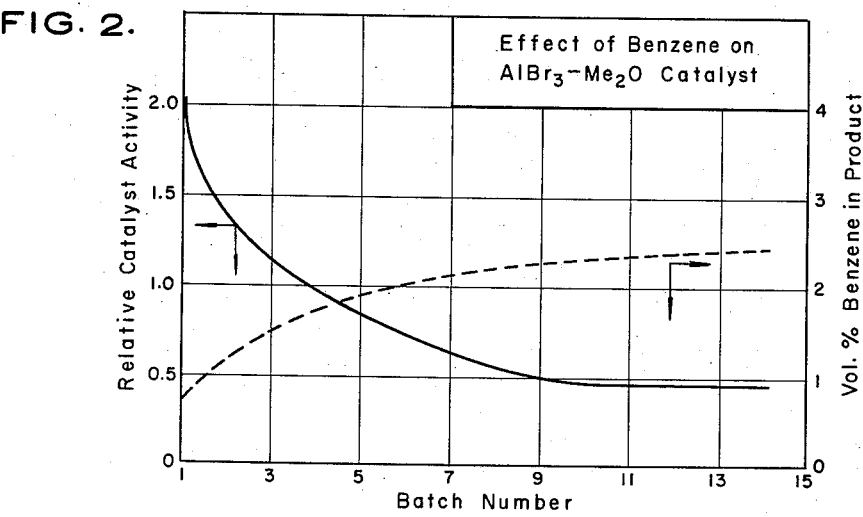
FIG. 2. Effect of Benzene on AlBr$_3$-Me$_2$O Catalyst
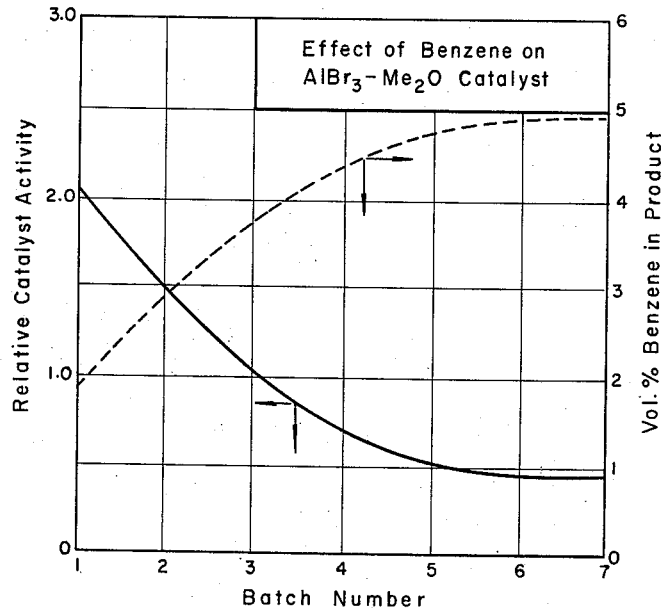
FIG. 3. Effect of Benzene on AlBr$_3$-Me$_2$O Catalyst United States Patent Office 3,190,940
Patented June 22, 1965

3,190,940
HYDROCARBON CONVERSION
David G. Walker, Henry A. Holcomb, and Boyd N. Hill, Baytown, Tex., assignors, by mesne assignments, to Esso Research and Engineering Company, Elizabeth, N.J., a corporation of Delaware
Filed June 8, 1962, Ser. No. 200,994
3 Claims. (Cl. 260—683.75)

This invention relates generally to a novel catalyst system for use in hydrocarbon conversion processes. More particularly, the invention relates to a process and catalyst system for use therewith for converting hydrocarbons to isomers thereof and especially to converting paraffinic hydrocarbons to iso-paraffins.

This application is a continuation-in-part of applications Ser. Nos. 781,125 and 781,126 entitled "Hydrocarbon Conversion" and "Isomerization Process," respectively, both filed December 17, 1958, by D. G. Walker, H. A. Holcomb, and B. N. Hill both of which applications are now abandoned.

The particular active conversion catalyst system of the invention comprises a reacted Group III-b metal halide and a free Group III-b metal halide; the reacted Group III-b metal halide comprises the combination of a Group III-b metal halide and a component containing atoms with at least one unshared pair of electrons and basic as a Lewis base to Group III-b metal halides, the Group III-b metal halides being acid as a Lewis acid. The Lewis base component and the Lewis acid Group III-b metal halide being employed in relative amounts in the catalyst phase such that the Lewis base site to Lewis acid site ratio is in the range from about 0.30 to 0.65 Lewis base sites to one Lewis acid site, with an optimum ratio of 0.45 to one.

A Lewis acid is any molecule radical or ion in which the normal electron grouping about some atom is incomplete so that the atom can accept an electron pair or pairs. Correspondingly, a Lewis base is a structure containing an atom which is capable of donating an electron pair.

When this particular catalyst system is used under isomerization conditions, an improved isomerization process for converting straight chain paraffinic hydrocarbons, especially the lower members of the series such as normal butane, normal pentane, normal hexane, normal heptane, etc., to corresponding iso-paraffins such as isobutane, iso-pentane, iso-hexane, iso-heptane, etc., results. High levels of catalyst activity for isomerization of the saturated hydrocarbons are obtained in this process; the catalyst system is essentially inactive for the promotion of cracking, disproportionation, and other side reactions; it overcomes the adverse effects of aromatic hydrocarbons in the isomerization feed; and additionally, the catalyst system shows good activity maintenance.

The Lewis base components or co-catalysts of the invention consist of methylether, phosphoric acid, or phosphorus pentoxide. Aluminum bromide is the preferred Group III-b metal halide to be used.

These particular co-catalysts are effective for the specific isomerization of normal paraffins in the presence of aromatic hydrocarbons.

Benzene and other aromatics (even in small concentrations of about 0.1 volume percent) inhibit seriously the activity of promoted aluminum halide catalyst for the specific isomerization of normal paraffins.

However, it has been found that aromatics in the isomerization feed stock are tolerated when the isomerization process is conducted utilitzing these particular co-catalysts. They resist the inhibitory effect of the aromatics to the isomerization conversion process while the aromatics remain substantially unaltered.

The experiments illustrating the invention were conducted as liquid phase "sludge" type catalysis.

When aluminum bromide is used as the Group III-b metal halide, an isomerization catalyst is obtained which is active for the specific isomerization of normal butane and higher molecular weight paraffins at temperatures in the range of 32° to 130° F. When aluminum chloride is used as the Group III-b metal halide, an isomerization catalyst is obtained which is active for the isomerization of normal butane and higher molecular weight paraffins at temperatures in the range of 70° to 160° F.

Accordingly, a primary object of the present invention is to provide a novel hydrocarbon conversion catalyst. An additional object of the present invention is to provide a process for the specific isomerization of normal paraffins. A further object of this invention is to provide a process for the specific isomerization of normal paraffins wherein the isomerization feed stock contains aromatics.

These and other objects and advantages of the invention will become apparent from the following description taken in conjunction with the drawings wherein:

FIGS. 2 and 3 show curves illustrating the effect of benzene on a dimethyl ether-aluminum bromide catalyst in the isomerization of paraffin hydrocarbons.

The following experimental data illustrate the practice of the invention. In the experiments aluminum bromide was added to a normal hexane feed composition contained in a reaction vessel. After brief stirring, a co-catalyst was added slowly with stirring. At the end of the reaction period, the hydrocarbon layer was separated from the sludge water, washed several times and analyzed by gas partition chromatography.

In the experiments shown in Tables I and II except for the run conducted with phosphorus pentoxide, the normal hexane feed in volume percent was 0.1 isobutane, 0.3 2,3-dimethylbutane, 0.8 2 and 3-methylpentane, 96.2 normal hexane, and 2.6 methylcyclopentane. The phosphorus pentoxide run feed composition was in volume percent 0.1 2,2-dimethylbutane, 0.3 2,3-dimethylbutane and 2-methylpentane, 0.4 3-methylpentane, 84.4 normal hexane, 2.0 methylcyclopentane, and 12.8 cyclohexane.

The temperature of the reaction, the time of reaction, the co-catalyst to catalyst ratio (Lewis base site to Lewis acid site) in the catalyst phase, the product analysis, the amount of feed, and the amount of catalyst are shown for each experiment.

Figure 1:
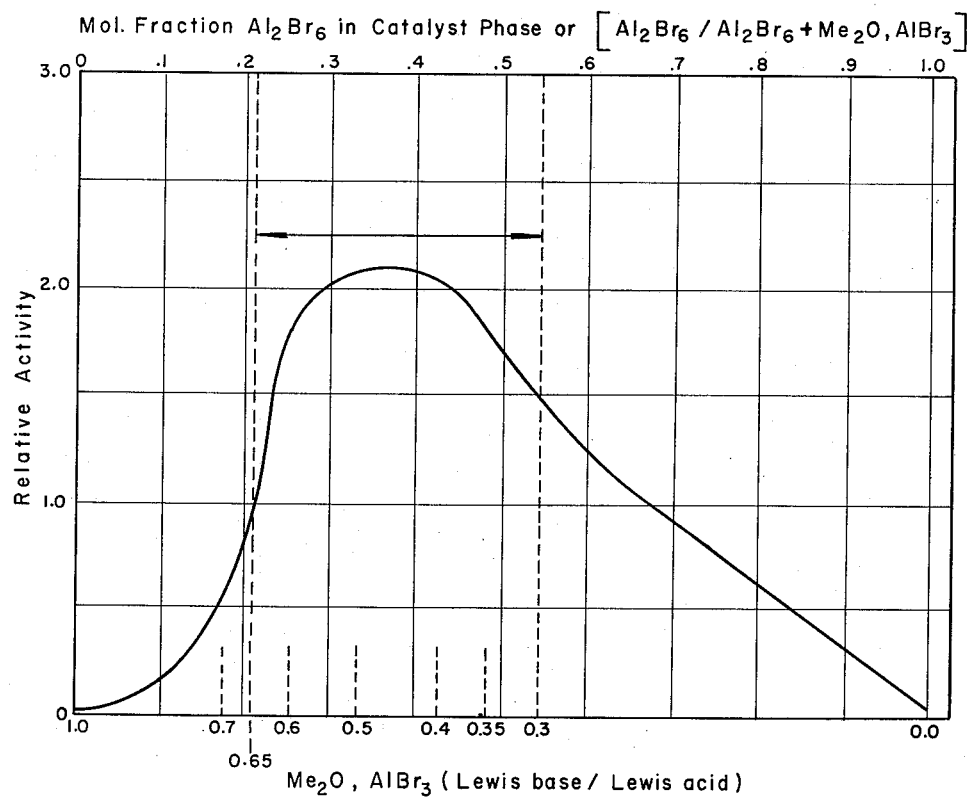
FIG. 1 illustrates the relative catalyst activity when the relative amounts of methyl ether relative to aluminum bromide are varied.

The data of Table I are plotted in FIG. 1. These data and the resulting curve were obtained by varying the amount of a co-catalyst, methylether, to a catalyst, aluminum bromide. Both the Lewis base site to Lewis acid site ratios and the mol fractions of $Al_2Br_6$ in the catalyst phase are plotted in this figure.

Thus, it is seen that by varying the ratios of Lewis base site to Lewis acid site in the catalyst phase, a substantially increased catalyst activity is obtained in the range of from about 0.3 to 0.65 as indicated by the arrowed line in the figure. An optimum Lewis base site to Lewis acid site is shown to be about 0.45.

In Table II data are shown for experiments employing the various co-catalysts, dimethylether, phosphorus pentoxide and phosphoric acid. The relative amounts of the co-catalyst and catalyst in the catalyst phase are such that

Table I

|  | A | B | C | D | E | F | G | H |
|---|---|---|---|---|---|---|---|---|
| Temp., °F | 78 | 78 | 78 | 78 | 78 | 78 | 78 | 78 |
| Reaction time (hrs.) | 1 | 1 | 1 | 1 | 1 | 1 | 1 | 1 |
| Mol feed/mol total catalyst | 7.5 | 7.5 | 7.5 | 7.5 | 7.5 | 7.5 | 7.5 | 7.5 |
| Methyl ether/AlBr$_3$ ratio in catalyst phase | 0.0 | 0.32 | 0.40 | 0.53 | 0.57 | 0.61 | 0.81 | 1.0 |

| Product analysis, mol percent | | | | | | | | |
|---|---|---|---|---|---|---|---|---|
| Component: | | | | | | | | |
| <Hexane | | | | | | | | |
| 2,2-dimethylbutane | | 0.9 | 1.0 | 1.0 | 1.0 | 1.0 | | |
| 2,3-dimethylbutane+2-methylpentane | 1.0 | 10.3 | 12.8 | 12.4 | 12.8 | 12.9 | 1.5 | 0.1 |
| 3-methylpentane | 0.4 | 3.6 | 4.3 | 4.3 | 4.2 | 4.5 | 0.6 | 0.7 |
| Normal hexane | 95.2 | 91.1 | 77.7 | 78.1 | 77.7 | 77.5 | 93.6 | 95.6 |
| Methylcyclopentane | 2.2 | 1.0 | 0.0 | 0.2 | | 0.2 | 1.7 | 2.8 |
| Cyclohexane | 1.2 | 4.0 | 3.7 | 3.9 | 3.7 | 3.9 | 2.1 | 0.2 |
| >Hexane | | | 0.5 | 0.2 | 0.5 | | 0.5 | 0.6 |
| Relative activity | .005 | 0.158 | 0.204 | 0.206 | 0.210 | 0.159 | .013 | .000 | the Lewis base site to Lewis acid site ratio is within the range of 0.30 to 0.65.

Table II

|  | A | B | C | D |
|---|---|---|---|---|
| Temp. °F | 78 | 32 | 110–115 | 110–115 |
| Reaction time (hrs.) | 3.0 | 4.0 | 1 | 1 |
| n-Hexane feed, ml | 150 | 75 | 46 | 46 |
| Co-catalyst, g. mol | [1] 0.152 | [1] 0.077 | [2] .124 | [3] 0.97 |
| AlBr$_3$, g. mol | 0.308 | 0.154 | .247 | 0.247 |
| Ratio (Lewis base/Lewis acid) in catalyst phase | 0.5 | 0.5 | 0.50 | 0.39 |

| Product analysis, mol percent | | | | |
|---|---|---|---|---|
| Component: | | | | |
| Isobutane | 7.7 | 0.0 | 0 | 0.1 |
| Normal butane | 0.3 | 0.0 | 0 | |
| Isopentane | 13.5 | 0.0 | 0.1 | 0.2 |
| Normal pentane | 2.4 | 0.0 | | |
| Cyclopentane | 0.4 | 0.0 | | |
| 2,2-dimethylbutane | 46.2 | 8.5 | 39.2 | 29.0 |
| 2,3-dimethylbutane + 2-methylpentane | 12.9 | 33.6 | 29.9 | 33.1 |
| 3-methylpentane | 3.3 | 8.9 | 10.3 | 11.4 |
| Normal hexane | 2.9 | 45.9 | 5.5 | 12.3 |
| Methylcyclopentane | | 0.2 | 1.6 | 1.6 |
| Cyclohexane | 0.4 | 2.9 | 13.4 | 12.3 |
| Normal heptane | 0.5 | | | |
| 2-methylhexane | 2.7 | | | |
| 3-methylhexane | 2.5 | | | |
| 2,2,4-dimethylpentane | 2.1 | | | |
| 3,3-dimethylpentane | 1.0 | | | |
| 2,2,3-trimethylbutane | 0.9 | | | |

[1] Methylether.
[2] Phosphoric acid.
[3] Phosphorus pentoxide.

Figure 4:
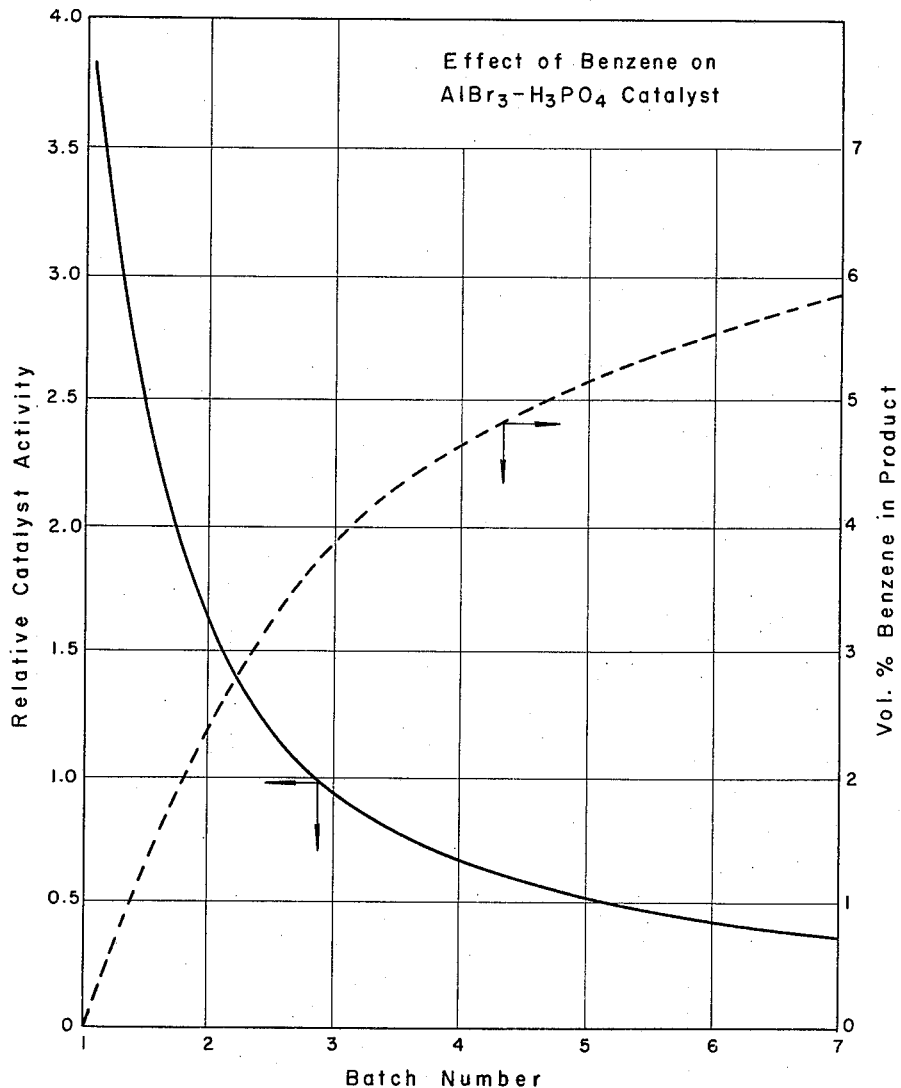
FIG. 4 shows curves illustrating the effect of benzene on a phosphoric acid-aluminum bromide catalyst.

A similar series of experiments but employing an aromatic hydrocarbon in the feed, the conditions for which are shown in Table III and the results of which are shown in FIGS. 2, 3, and 4, were performed.

Table III

|  | 110–115 | 110–115 | 110–115 |
|---|---|---|---|
| Temp., °F | | | |
| Time | 1 hr. successive batch treats | | |
| Feed, g. mol: | | | |
| N-hexane | 0.300 | 0.300 | 0.300 |
| Methylcyclopentane | 0.037 | 0.036 | 0.036 |
| Benzene | 0.015 | 0.034 | 0.034 |
| Catalyst, g. mol: | | | |
| Aluminum bromide | 0.247 | 0.247 | 0.247 |
| Methylether | 0.1235 | 0.1235 | |
| Phosphoric acid (96%) | | | 0.082 |

It is seen in FIGS. 2, 3, and 4 that the relative catalyst activity approaches a constant value (the solid line curves) as the percent of benzene in the product approaches a constant value (the dashed line curves). Thus, these co-catalysts tolerate the benzene in the feed, and although the catalysts initially decrease in activity, a high level of catalyst activity is maintained thereafter.

In Table IV data are shown for similar experiments employing dimethyl ether, phosphoric acid, and phosphorus pentoxide as co-catalysts in which an aromatic hydrocarbon is employed in the feed. The relative amounts of the co-catalysts and catalyst in the catalyst phase are such that the Lewis base site to Lewis acid site ratio is within the range of 0.30 to 0.65. The compositions of the feed in volume percents for the dimethyl ether run A and for the phosphoric acid runs were 84.8% normal hexane, 8.7% methylcyclopentane, and 6.5% benzene. The dimethyl ether B run feed composition in volume percents was 87.6% normal hexane, 9.4% methylcyclopentane, and 3% benzene; and the phosphorus pentoxide run feed composition in volume percents was 83.5% normal hexane, 2.5% methylcyclopentane, 8% cyclohexane, and 6% benzene.

Table IV

|  | A | B | C | D | E | F |
|---|---|---|---|---|---|---|
| Temp., °F | 110–115 | 110–115 | 110 | 110 | 110 | 110 |
| Reaction time (hrs.) | 1 | 1 | 1 | 2 | 3 | 4 |
| Co-catalyst, g. mols | [1] 0.1235 | [1] 0.1235 | [2] .082 | [2] .082 | [2] .082 | [3] .097 |
| AlBr$_3$, g. mols | 0.247 | 0.247 | 0.247 | 0.247 | 0.247 | 0.247 |
| Feed, g. mols | 0.370 | 0.354 | 0.370 | 0.370 | 0.370 | 0.300 |
| Benzene, vol. percent | 6.5 | 3.0 | 6.5 | 6.5 | 6.5 | .6 |
| Ratio[4] | 0.5 | 0.5 | 0.33 | 0.33 | 0.33 | 0.4 |

| Product analysis, mol percent | | | | | | |
|---|---|---|---|---|---|---|
| Components: | | | | | | |
| Pentane Minus | 0 | 0 | 0 | 0 | 0.1 | 0.1 |
| 2,2-dimethylbutane | 17.2 | 18.2 | 10.9 | 25.8 | 35.0 | 30.0 |
| 2,3-dimethylpentane+2-methylpentane | 40.8 | 41.2 | 30.7 | 33.9 | 30.0 | 31.7 |
| 3-methylpentane | 14.0 | 14.4 | 11.4 | 12.5 | 11.2 | 11.5 |
| Normal hexane | 14.0 | 13.4 | 30.6 | 11.2 | 6.5 | 8.9 |
| Methylcyclopentane | 1.5 | 1.4 | 1.5 | 1.8 | 2.0 | 1.8 |
| Cyclohexane | 10.7 | 10.7 | 12.4 | 13.4 | 14.5 | 14.7 |
| Benzene | 1.8 | 0.7 | 2.5 | 1.4 | 0.7 | 1.3 |

[1] (CH$_3$)$_2$O.
[2] H$_3$PO$_4$.
[3] P$_2$O$_5$.
[4] Lewis base/Lewis acid in catalyst phase.

In the preceding tables the concentration of 2,2-dimethylbutane in the hexane isomers is a good measure of the extent of isomerization because it is the predominant of the paraffin hexanes at equilibrium, and it is also the slowest isomer to approach equilibrium when normal hexane is isomerized. A criterion for specific isomerization is the amount of 2,2-dimethylbutane with respect to the amount of non-hexane material produced. As seen in Tables II and IV, the amount of 2,2-dimethylbutane produced is large relative to the amount of non-hexane material produced and thus good specific isomerization was obtained in these experiments.

Although the experimental runs were conducted employing normal hexane as the feed stock for the isomerization process, the invention is not to be considered as limited thereto. For example, normal paraffinic hydrocarbons which may be converted into iso-paraffinic hydrocarbons by the present process include normal butane and higher boiling paraffinic hydrocarbons of the straight chain structure.

Having fully described the objects and method of operation of the invention, we claim:

1. A hydrocarbon isomerization process for isomerizing paraffinic hydrocarbons to the isomers thereof in the presence of aromatics comprising reacting a normal paraffinic hydrocarbon feed stock containing aromatic hydrocarbons in amounts from about 0.1 to about 6.5 volume percent and cycloparaffins with a catalyst under isomerization conditions, said catalyst consisting of phosphorus pentoxide and aluminum halide in a mol ratio, respectively, of 0.30 to 0.65, said catalyst in said process being resistant to the inhibitory effect of the aromatic to the isomerization process and the aromatics remaining substantially unaltered during said isomerization process.

2. A hydrocarbon isomerization process comprising reacting under isomerization conditions a substantially normal paraffinic hydrocarbon feedstock containing cycloparaffinic hydrocarbons and consisting essentially of hydrocarbons having 4 to 7 carbon atoms per molecule with an aluminum halide catalyst and a phosphorus pentoxide cocatalyst, the mol ratio of the phosphorus pentoxide to aluminum halide being in the range from about 0.30 to 0.65.

3. A hydrocarbon isomerization catalyst system consisting essentially of an aluminum halide catalyst and a phosphorus pentoxide cocatalyst, the mol ratio of the phosphorus pentoxide to the aluminum halide being in the range from about 0.30 to 0.65.

References Cited by the Examiner

UNITED STATES PATENTS

| | | | |
|---|---|---|---|
| 2,358,011 | 9/44 | Ipatieff et al. | 260—683.75 |
| 2,389,250 | 11/45 | Francis et al. | 260—683.75 |
| 2,468,746 | 5/49 | Greensfelder et al. | 260—683.76 |

ALPHONSO D. SULLIVAN, *Primary Examiner.*